(12) United States Patent
Baumann et al.

(10) Patent No.: US 8,826,828 B2
(45) Date of Patent: Sep. 9, 2014

(54) FLOOR PAN FOR HIGH-SPEED TRAINS

(75) Inventors: Thomas Baumann, Würzburg (DE); Stefan Bernhardt, Schwarzenbruck/Lindelburg (DE); Rüdiger Mangler, Krefeld (DE)

(73) Assignee: Siemens Aktiengesellschaft, Munich (DE)

( * ) Notice: Subject to any disclaimer, the term of this patent is extended or adjusted under 35 U.S.C. 154(b) by 108 days.

(21) Appl. No.: 13/500,945

(22) PCT Filed: Oct. 5, 2010

(86) PCT No.: PCT/EP2010/064802
§ 371 (c)(1),
(2), (4) Date: Jun. 6, 2012

(87) PCT Pub. No.: WO2011/042419
PCT Pub. Date: Apr. 14, 2011

(65) Prior Publication Data
US 2012/0240816 A1    Sep. 27, 2012

(30) Foreign Application Priority Data
Oct. 8, 2009  (RU) ................................ 2009137236

(51) Int. Cl.
*B61D 17/10*   (2006.01)
*B61C 17/04*   (2006.01)

(52) U.S. Cl.
USPC ....................................................... 105/422

(58) Field of Classification Search
USPC ........................... 105/355, 404, 413, 414, 422
See application file for complete search history.

(56) References Cited

U.S. PATENT DOCUMENTS

| 2,143,547 | A |   | 1/1939 | Dean |         |
|-----------|---|---|--------|------|---------|
| 4,186,665 | A | * | 2/1980 | de Jong et al. | 105/456 |
| 4,958,844 | A | * | 9/1990 | Hancock | 280/785 |
| 6,237,506 | B1| * | 5/2001 | Forbes | 105/355 |
| 2002/0029721 | A1 |   | 3/2002 | Takeichi et al. | |

FOREIGN PATENT DOCUMENTS

| CA | 2313834 A1 | 1/2002 |
| EP | 0063214 A1 | 10/1982 |
| WO | 2006/021514 A1 | 3/2006 |

OTHER PUBLICATIONS

International Search Report of PCT/EP2010/064802, Dated May 31, 2011.

* cited by examiner

*Primary Examiner* — Zachary Kuhfuss
(74) *Attorney, Agent, or Firm* — Laurence A. Greenberg; Werner H. Stemer; Ralph E. Locher

(57) ABSTRACT

A floor pan for high-speed trains is disposed below a car floor and implemented as a stand encased by a protective floor and has lateral carrier walls with side plates fastened thereon. The floor pan provides protection against damage by ballast stones to the under-floor space in which the equipment is stored.

9 Claims, 4 Drawing Sheets

FLOOR PAN FOR HIGH-SPEED TRAINS

BACKGROUND OF THE INVENTION

Field of the Invention

The invention relates to a floor pan for high-speed trains, which belongs to the field of railroad transportation and can be used to form high-speed passenger trains. The entire story of railroad transportation until now has featured efforts to increase the operating times of trains, minimize travel times, increase the utilization rate of the transportation capacities of routes and to improve passenger comfort.

Land transportation means nowadays railroad transportation in which speeds of over 200 km/h are achieved by the trains.

In technology, a car body for a high-speed vehicle is known today (see SU 1652150 A1, Cl. B62D 35/00, publication date: May 30, 1991). The known invention belongs to the field of transportation, mainly to that of high-speed vehicles for railroad transportation. The car body of the known vehicle is composed of an upper and a lower head part. In order to increase the efficiency by reducing the aerodynamic resistance, the end part is connected to the upper part by means of joint elements, wherein guide strips for interacting with the abovementioned tie rods are permanently mounted on the inside of the upper part in the connecting region.

The known technical solution has narrow operating possibilities since there are no protective elements provided in the space under the car floor over the entire length of the space, for which reason turbulent airstreams arise here and bring about an increase in the energy losses.

In technology, today a vehicle which is provided for operation in railroad systems with a ballast track superstructure is known (see WO 2006/021514, Cl. B61D17/02, publication date: Mar. 2, 2006).

The known vehicle for operation in railroad systems with a ballast track superstructure is defined by the fact that the lower vehicle part is equipped with protective screens which are formed by reflection elements and provide protection for the vehicle faces and vehicle component faces running perpendicularly with respect to the direction of travel, wherein these reflection elements are embodied and arranged in such a way that the ballast stones which are thrown up are deflected in the opposite direction to the direction of travel.

BRIEF SUMMARY OF THE INVENTION

The object achieved with the known invention comprises providing protection against damage by ballast stones to the underfloor space in which the traction motor, wheel set shafts, crossmembers, transverse retainers etc. are arranged. However, the known invention does not achieve the object of preventing the possible generation of turbulent flows around the car underfloor space, which flows themselves adversely affect the train operation.

Taking the above as a starting point, the invention is based on the object of ensuring equipment protection of appropriate quality for high-speed operation and of preventing coarse particles of stone, dust and snow from penetrating the interior, and of improving operating conditions for the underfloor equipment while at the same time maintaining the aerodynamic underfloor space properties.

The present object is achieved in that the floor pan for high-speed trains is arranged under the car floor over the entire length of the underfloor space and is embodied as a framework which is encased with a protective floor and lateral carrier walls having the side panels attached thereto. This proves the advantage of implementing a floor pan with good aerodynamics and increased strength properties and compression properties, in particular in the regions where movable panels are connected to fixed car body elements.

In this context, the side panels which are embodied as cell structures can be mounted in a removable fashion on the side walls, for which purpose releasable connections in the form of screws can be used, which screws are respectively arranged within a pot which is attached in the side plate and is provided on its inner face with a locking ring for preventing the screws from falling out, wherein the pot is screwed into the framework by means of a thread and can be secured to a latching element in the framework. This can result in increased reliability of the releasable connections, which prevents connecting elements from dropping out. The framework can constitute here arcuate supports which are connected to car-body longitudinal beams, in each case in opposite directions to one another, and when free support ends are connected said supports form a transverse profile with frictional engagement. Maintenance flaps can be formed on individual side panels in the region of the car assemblies. Furthermore, individual side panels can be provided with grill openings serving for ventilation. In one of the embodiments, the framework supports can be connected in the diagonal direction to clamping beams made of high-strength steel. In one individual embodiment, the protective floor can be embodied as plates which can be equipped not only with the releasable connections but also with controllable latching elements. The closed framework design, the stiffening cell design of the lateral carrier walls and the side panels connected thereto as well as the protective floor plates which form the load-bearing frictionally engaging spatial envelope which is connected to the car body of the high-speed train prevents the generation of turbulent flows both outside the floor pan and in the interior thereof, as a result of which strength properties and compression conditions are improved, which has a positive significance for the aerodynamic train properties and the speed.

The mounting of the side panels on the side walls with releasable connections ensures rapid and easy mounting/disassembly of the structure which is provided. The embodiment of the releasable connections as screws, each of which is arranged within a pot which is secured in the side panel and provided with a fixing ring on the inner face, increases the strength of the floor pan provided for high-speed trains. Furthermore, this embodiment of the releasable connection permits vibrations to be reduced, which is particularly important during the operation of speed trains. The screw has a locking ring on the inner face for preventing the screw from dropping out, which provides additional reliability of the structure.

The embodiment of the framework in the form of arcuate supports which are arranged on the longitudinal beams of the high-speed train car body, in each case in opposite directions to one another, and which form a transverse profile with frictional engagement when the free support ends are connected, permits a high level of strength to be achieved.

The provision of individual side panels with maintenance flaps in the region of the car assemblies is due to the need to perform maintenance.

Furthermore, individual side panels are provided with grill openings in order to ensure the necessary ventilation.

The embodiment of the framework supports as clamping beams which are connected in the diagonal direction and are made of high-strength steel ensures additional framework strength.

The protective floor can be embodied from plates with increased strength, which plates can be equipped not only with the releasable connections but also with controllable latching elements which prevent the plates from dropping out during its disassembly. The features described above are significant and have a cause/effect relationship with one another, as a result of which an entirety of essential features is formed which are necessary and sufficient for achieving the object of extending the operating possibilities while at the same time increasing the strength possibilities.

In the drawings:

DESCRIPTION OF THE INVENTION

Figure 1:
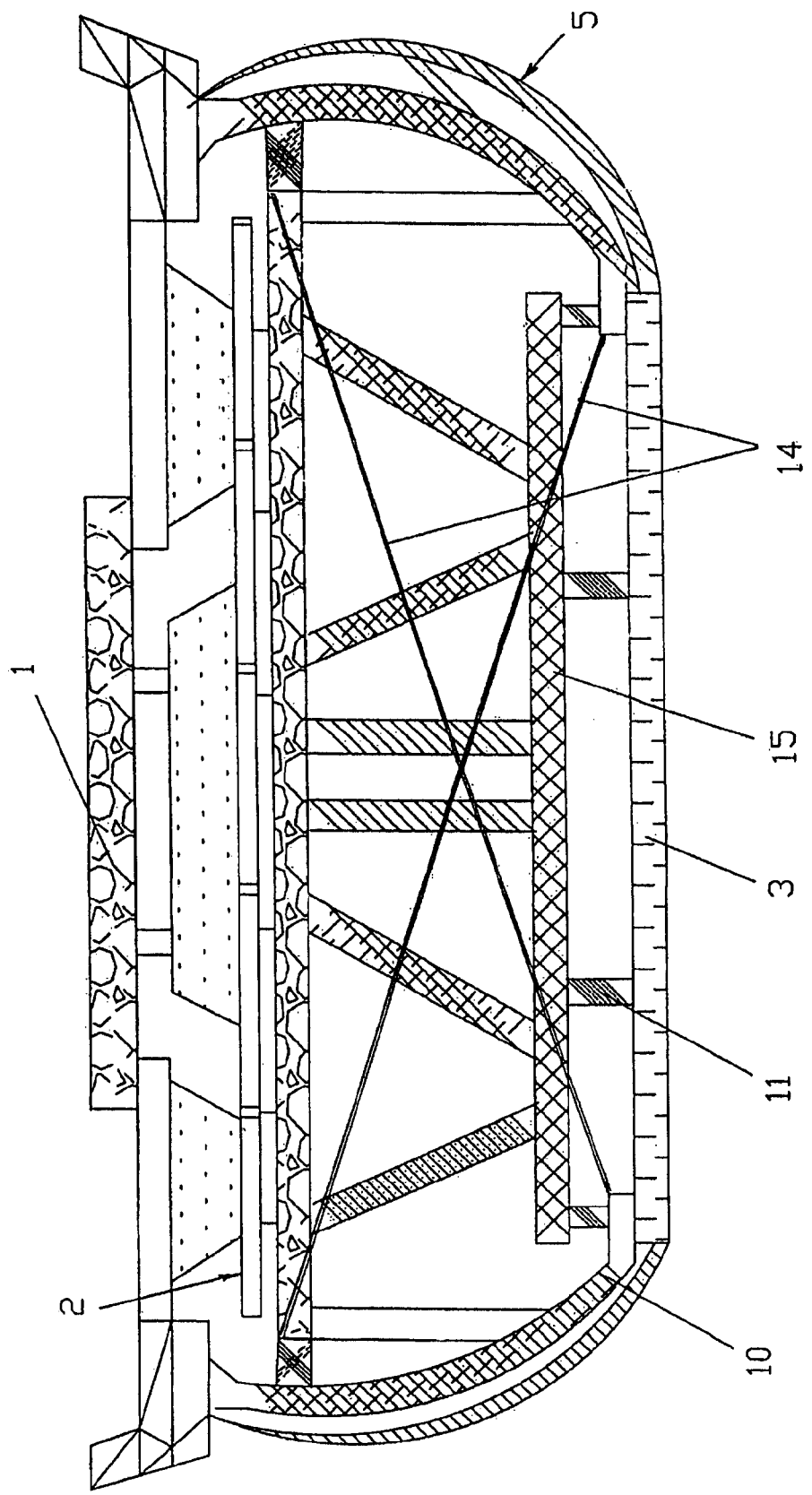
FIG. 1 shows a section through the floor pan with a transverse clamping beam made of stainless steel.
Figure 2:
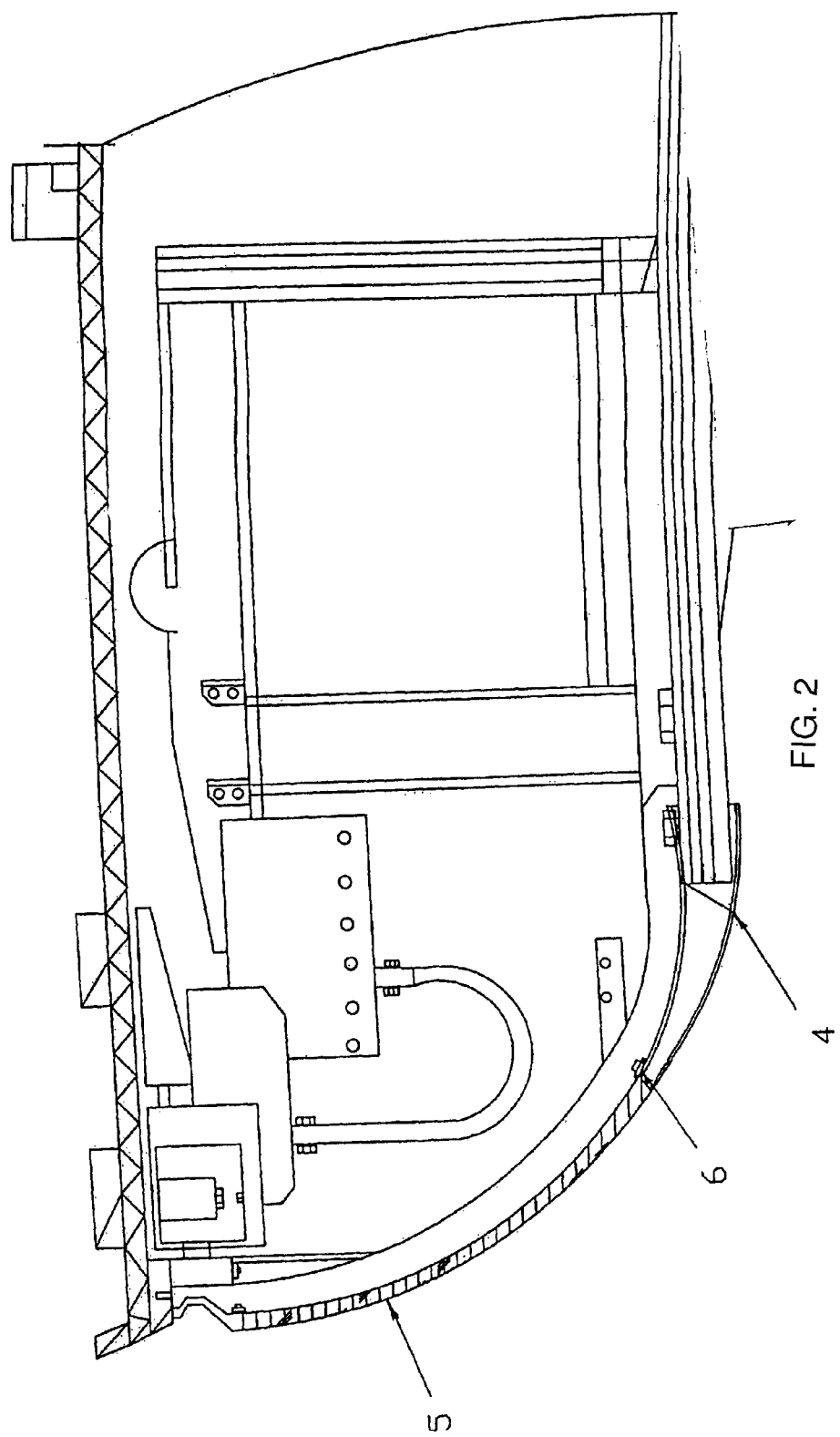
FIG. 2 shows a partial section through the floor pan.
Figure 3:
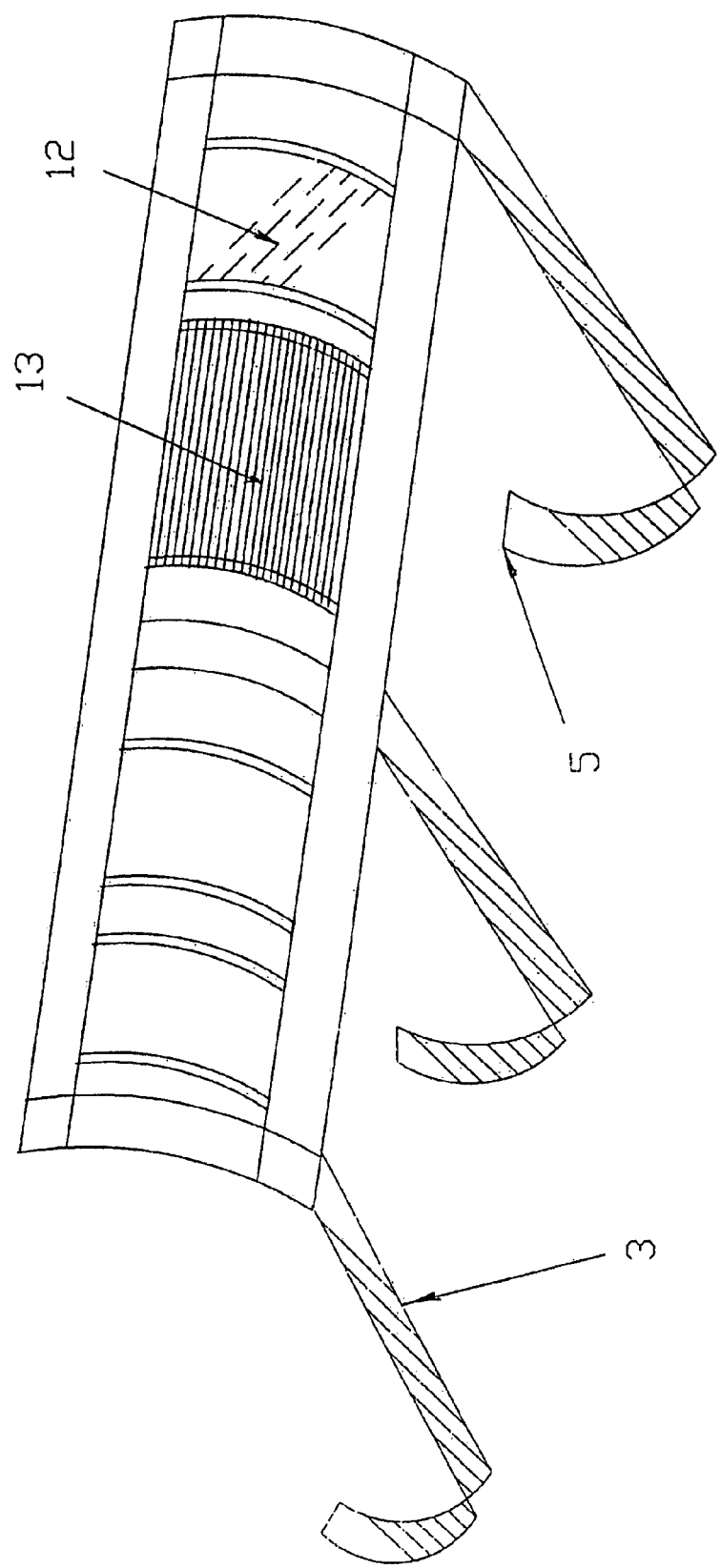
FIG. 3 shows a 3-D segment through the floor pan with reinforcement elements.

The floor pan which is provided for high-speed trains is arranged under the floor 1 of the car over the entire floor length and is embodied as a framework 2 (see FIG. 3) which is encased with a protective floor 3 and the lateral carrier walls 4 with the side panels (FIGS. 1, 2) attached thereto. The side panels 5 are embodied as cell structures and are mounted in a removable fashion on the side walls 4 with releasable connections. The releasable connections are embodied as screws 6, wherein each screw is arranged within the pot 7 (see FIG. 5) of a pot which is attached in the side plate and which is provided on its inner face with a locking ring 8 for preventing the screw 6 from dropping out, wherein the pot is screwed into the framework by means of a thread and is secured in the framework with a nut-shaped latching element 9.

The framework constitutes arcuate supports 10 which are connected to the longitudinal beams 11 (see FIG. 3) of the high-speed train car body, in each case in opposite directions to one another, and when the free support ends are connected said supports 10 form a transverse profile with frictional engagement.

Individual side panels 5 in the region of the car assemblies are embodied with maintenance parts 12 for maintenance on these assemblies.

Figure 4:
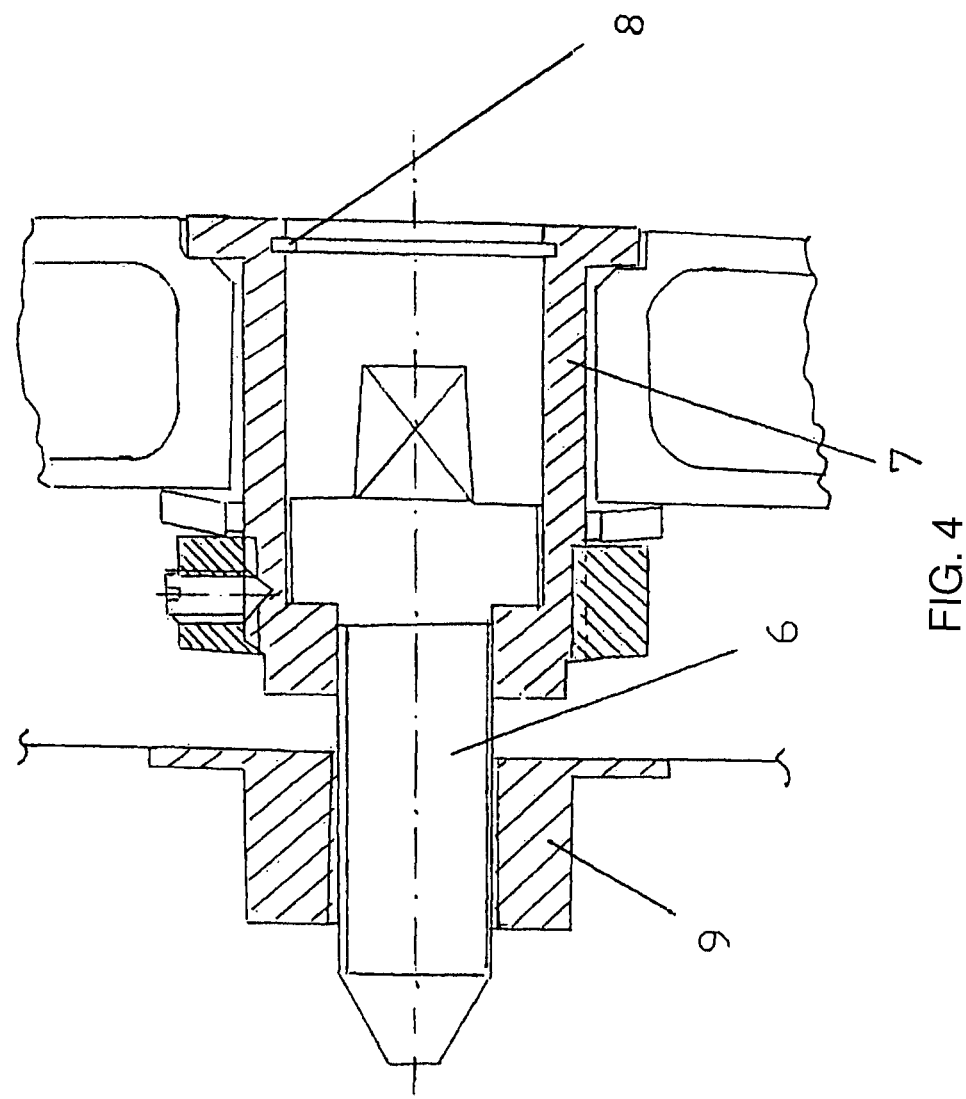
FIG. 4 shows a releasable connection.

Individual side panels 5 are provided with grill openings 13 for ventilation (see FIG. 4).

An embodiment of the floor pan in which the framework supports are connected in the diagonal direction to clamping beams 14 (see FIG. 3) is also possible, for which purpose an increase in strength for the framework 2 is achieved.

The protective floor 3 is embodied from plates with increased strength. The plates are not only equipped with the releasable connections but also with controllable latching elements which prevent the plates from dropping out during disassembly.

The mounting of the floor pan which is provided for high-speed trains is carried out as follows:

The supports 10 which are embodied in arcuate shape are screwed into the groove blocks on the longitudinal support 15. The supports 10 are also attached to the edge longitudinal beam 11 of the high-speed train car body, in each case in opposite directions to one another, in such a way that the free ends of the support beams 10 form a transverse profile with frictional engagement.

The framework 2 is then encased with the protective floor 3 and the lateral carrier walls 4 with side panels 5 attached thereto. The side panels 5 are embodied as cell structures.

The side panels 5 are embodied as cell structures. The side panels 5 are attached to the side walls 4 with releasable connections in the form of screws 6 which permit the disassembly. Each screw 6 is arranged within a pot 7 (see FIG. 5) which is secured in the side panel 5. The screws 6 are each provided with a locking ring 8 which completely prevents the screws from dropping out. Individual side panels 5 are embodied with maintenance flaps 12 in the region of the car assemblies (see FIG. 4).

Individual side panels are provided with grill openings 13 for ventilation (see FIG. 4).

In one individual embodiment of the utility model, the arcuate supports 10 of the framework 2 are connected in the diagonal direction to clamping beams 14, as a result of which the strength properties for the framework 2 are increased. In one of the utility model designs, the protective floor 3 is embodied from plates with increased strength.

The design which is provided for the floor pan therefore permits the use of said floor pan for the cars of the high-speed trains, wherein reliable protection for the underfloor equipment is provided against stones, dust and snow, the operating possibilities are extended and the aerodynamic properties are improved, which leads to an increase in the speeds.

The invention claimed is:

1. A floor pan for high-speed trains having a car floor, the floor plan comprising:
   the floor pan disposed under the car floor over an entire length of an under-floor space, said floor pan, containing:
   car-body longitudinal beams;
   a protective floor;
   lateral carrier walls;
   side panels attached to said lateral carrier walls;
   a framework encased by said protective floor, said side panels and said lateral carrier walls, said framework including arcuate supports which are connected opposite one another to said car-body longitudinal beams, and when free support ends of said arcuate supports are connected to said longitudinal beams, said arcuate supports form a transverse profile with frictional engagement.

2. The floor pan according to claim 1, wherein said side panels are configured as cell structures and are mounted in a removable fashion on said lateral carrier walls.

3. The floor pan according to claim 2, further comprising releasable connections in a form of screws used for mounting said side panels onto said lateral carrier walls.

4. The floor pan according to claim 3, further comprising a pot attached to said side panels, said screws disposed within said pot.

5. The floor pan according to claim 1, wherein individual ones of said side panels have maintenance flaps in a region of car assemblies.

6. The floor pan according to claim 1, wherein said individual ones of said side panels have grill openings formed therein.

7. The floor pan according to claim 1, further comprising:
   clamping beams made of stainless steel; and
   said arcuate supports are connected in a diagonal direction to said clamping beams.

8. A floor pan for high-speed trains having a car floor, the floor plan comprising:

the floor pan disposed under the car floor over an entire length of an under-floor space, said floor pan, containing:
a protective floor;
lateral carrier walls;
side panels attached to said lateral carrier walls, said side panels being configured as cell structures being mounted in a removable fashion on said lateral carrier walls;
a framework encased by said protective floor, said side panels and said lateral carrier walls;
releasable connections in a form of screws used for mounting said side panels onto said lateral carrier walls; and
a pot attached to said side panels, said screws disposed within said pot, said pot having an inner face and a locking ring on said inner face, said locking ring preventing said screws from falling out.

9. A floor pan for high-speed trains having a car floor, the floor plan comprising:

the floor pan disposed under the car floor over an entire length of an under-floor space, said floor pan, containing:
a protective floor;
lateral carrier walls;
side panels attached to said lateral carrier walls, said side panels being configured as cell structures being mounted in a removable fashion on said lateral carrier walls;
a framework encased by said protective floor, said side panels and said lateral carrier walls;
releasable connections in a form of screws used for mounting said side panels onto said lateral carrier walls;
a pot attached to said side panels, said screws disposed within said pot; and
a latching element disposed in said framework, said pot being screwed into said framework by means of a thread and being attached to said latching element in said framework.

* * * * *